(12) United States Patent
Trottier-Lapointe et al.

(10) Patent No.: US 12,345,905 B2
(45) Date of Patent: Jul. 1, 2025

(54) OPTICAL ARTICLE HAVING A REFLECTIVE COATING WITH HIGH ABRASION-RESISTANCE

(71) Applicant: ESSILOR INTERNATIONAL, Charenton-le-Pont (FR)

(72) Inventors: William Trottier-Lapointe, Charenton-le-Pont (FR); Alexis Theoden, Charenton-le-Pont (FR); Philippe Romand, Charenton-le-Pont (FR); Surin Maidam, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 901 days.

(21) Appl. No.: 17/414,799

(22) PCT Filed: Dec. 18, 2019

(86) PCT No.: PCT/EP2019/086066
§ 371 (c)(1),
(2) Date: Jun. 16, 2021

(87) PCT Pub. No.: WO2020/127564
PCT Pub. Date: Jun. 25, 2020

(65) Prior Publication Data
US 2022/0066079 A1    Mar. 3, 2022

(30) Foreign Application Priority Data
Dec. 18, 2018   (EP) .................... 18306727

(51) Int. Cl.
*G02B 5/28*    (2006.01)
*G02C 7/02*    (2006.01)

(52) U.S. Cl.
CPC ............. *G02B 5/286* (2013.01); *G02C 7/022* (2013.01)

(58) Field of Classification Search
CPC ........ G02B 5/286; G02B 5/285; G02C 7/022; G02C 7/107
See application file for complete search history.

(56) References Cited

U.S. PATENT DOCUMENTS

| | | |
|---|---|---|
| 2004/0191682 A1 | 9/2004 | Marechal |
| 2008/0002260 A1 | 1/2008 | Arrouy et al. |

(Continued)

FOREIGN PATENT DOCUMENTS

| | | |
|---|---|---|
| EP | 3 118 658 | 1/2017 |
| EP | 3 242 150 | 11/2017 |

(Continued)

OTHER PUBLICATIONS

International Search Report for PCT/EP2019/086066 dated Jul. 6, 2020, 6 pages.

(Continued)

*Primary Examiner* — Sharrief I Broome
*Assistant Examiner* — K Muhammad
(74) *Attorney, Agent, or Firm* — NIXON & VANDERHYE (57) ABSTRACT

Disclosed is an optical article including a substrate having at least one main face coated with a reflective coating including a stack of at least one high refractive index layer having a refractive index higher than 1.55 and at least one low refractive index layer having a refractive index of 1.55 or less, in which the thicknesses of the layers in the reflective coating have been optimized according to specific design rules in order to boost the abrasion resistance of the optical article.

18 Claims, 1 Drawing Sheet

(56) References Cited

U.S. PATENT DOCUMENTS

| | | | |
|---|---|---|---|
| 2008/0055719 A1* | 3/2008 | Perkins | G02B 5/3058 |
| | | | 359/485.05 |
| 2008/0206470 A1 | 8/2008 | Thomas et al. | |
| 2010/0149642 A1 | 6/2010 | Chen et al. | |
| 2012/0081792 A1 | 4/2012 | Neuffer | |
| 2015/0098058 A1 | 4/2015 | De Ayguavives et al. | |
| 2015/0146161 A1 | 5/2015 | Rigato et al. | |
| 2016/0306190 A1* | 10/2016 | Takahashi | G02C 7/10 |
| 2016/0355930 A1* | 12/2016 | Tamai | C23C 24/02 |
| 2017/0003520 A1* | 1/2017 | Iwasaki | G02B 27/0018 |
| 2018/0113238 A1 | 4/2018 | Yoshida | |
| 2019/0137660 A1* | 5/2019 | Ding | G02B 5/282 |

FOREIGN PATENT DOCUMENTS

| | | |
|---|---|---|
| EP | 3 282 292 | 2/2018 |
| EP | 3 392 680 | 10/2018 |
| JP | H07246366 A | 9/1995 |
| JP | 2000066149 A | 3/2000 |
| JP | 2003-195003 | 7/2003 |
| JP | 2003-294906 | 10/2003 |
| WO | 2013171435 A1 | 11/2013 |
| WO | 2018/033687 | 2/2018 |
| WO | 2020/021107 | 1/2020 |

OTHER PUBLICATIONS

Written Opinion of the ISA for PCT/EP2019/086066 dated Jul. 6, 2020, 12 pages.

* cited by examiner

OPTICAL ARTICLE HAVING A REFLECTIVE COATING WITH HIGH ABRASION-RESISTANCE

This application is the U.S. national phase of International Application No. PCT/EP2019/086066 filed Dec. 18, 2019 which designated the U.S. and claims priority to EP patent application Ser. No. 18/306,727.1 filed Dec. 18, 2019, the entire contents of each of which are hereby incorporated by reference.

BACKGROUND OF THE INVENTION

Field of the Invention

The invention relates to an optical article comprising a substrate coated with a multilayer transparent coating that is reflective in the visible range, having an improved abrasion resistance, in particular an ophthalmic lens, and a method of manufacturing such optical article.

Description of the Related Art

It is a common practice in the art to coat at least one main surface of an optical substrate with several coatings for imparting to the finished article additional or improved optical or mechanical properties. These coatings are designated in general as functional coatings.

The various coatings that may be used to impart a plurality of mechanical and/or optical properties may be impact-resistant coating layers, abrasion- and/or scratch-resistant coating layers, anti-reflection and/or reflective coating layers, anti-fouling layers and/or anti-fog layers.

Reflective coatings are generally applied to a surface of an optical article so as to improve the contrast of viewed images through said optical article, as well as to provide a reduction in transmitted visible, ultra-violet or infrared light. They may also impart a colored appearance to the optical article, which may be desirable for aesthetic purposes.

Yet, resistance to abrasion and/or scratch of these coatings is usually not sufficient, which is critical for solar lenses for sunglasses having a reflective front face, as compared to classical non solar or antireflective lenses. Indeed, the presence of scratches on the reflective front face of a solar lens is particularly perceptible for a wearer or an observer due to the color and brightness contrast between the light reflected from the scratches and the light reflected from the undamaged surface of the coating. A wearer may undergo a reduction in the quality of the vision, while an observer may found the scratched solar lenses aesthetically less appealing. This is particularly the case for reflective lenses displaying a mirror effect. Mirror coatings generally have poor abrasion resistance and as such are easily damaged.

Different ways to improve the abrasion resistance of an optical article, which is sensitive to scratches from environment, can be found in the literature. For instance, it has been proposed to increase the total thickness of the anti-reflection coating, such as in JP 2003-195003 and JP 2003-294906, which describe a lens coated with a primer coating, a hard coat and a 7-layer anti-reflection coating comprising alternated layers of $SiO_2$ and $TiO_2$, the latter being deposited with ion assistance and known to be sensitive to photodegradation.

U.S. Pat. No. 8,982,466 relates to an optical lens having a hard coat and a multilayer anti-reflection coating in which the high-refractive-index layers, made of $TiO_2$, together have a thickness of less than 40 nm.

US 2008/002260 discloses an optical article having antireflection properties and high thermal resistance, comprising a substrate having at least one main face coated with a multilayer anti-reflection coating in which the ratio of physical thickness of low refractive index layers/high refractive index layers is generally higher than 2.1.

US 2008/206470 relates to a process for manufacturing an optical article having antireflection or reflective properties, comprising a sub-layer a sub-layer and a multilayer stack. In order to increase the abrasion resistance of the optical article, the sub-layer has to be deposited in a vacuum chamber with an additional gas supply during the deposition step, and the exposed surface of the sub-layer has to be submitted to an ionic bombardment treatment prior to depositing the multilayer stack.

EP 3392680 suggests the control of the thicknesses of the layers in an interferential coating in order to increase abrasion resistance of an optical article, i.e., the use of a ratio of physical thickness of external low refractive index layer(s)/external high refractive index layer(s) higher than or equal to 2.

US 2004/191682 discloses a reflective coating for a surface of an optical substrate, including a plurality of dielectric material layers of alternating high and low refractive index, the thickness and/or number of the layers being selected to cause the reflective coating to be scratch masking, which means that the intensity and color of the light reflected from the surface of the optical substrate do not change substantially with changes in the thickness of the coating, e.g., when the coating is scratched. Thus, this reflective coating is not capable of avoiding or limiting the occurrence of scratches, which are only visually masked.

WO 2018/033687 relates to an ophthalmic lens for sunglasses comprising a substrate having a front main face covered with a multilayer inorganic reflective coating in the visible spectrum, consisting of a stack comprising at least two low-refractive-index layers alternating with at least one high-refractive-index layer of specific thicknesses and deposited through specific processes, said coating having a thickness of less than or equal to 600 nm and a Bayer ISTM abrasion-resistance value higher than 10. When the reflective coating is a 3-layer coating, its thickness is relatively weak (<300 nm) and its layer that is the closest to the substrate is a low refractive index layer having a thickness of 120-170 nm. When the reflective coating has 4 layers or more, its penultimate low refractive index layer has a low thickness, ranging from 40 to 80 nm.

Other interferential coatings are disclosed in EP 3282292 (antireflective coating having a high reflection in the near infrared region and strongly reducing reflection in the visible region), EP 3242150 (reflective) and EP 3118658 (reflective).

SUMMARY OF THE INVENTION

An objective of the current invention is to provide a transparent optical article comprising an organic or mineral glass substrate bearing a reflective coating, preferably a lens, and more preferably an ophthalmic lens for eyeglasses, said reflective coating having an improved abrasion and/or scratch resistance over already known reflective coated optical articles, a good adhesion to the substrate and a good resistance to heat and temperature variations. These properties should be obtained without decreasing the optical performances and other mechanical performances of said article, such as reflection performance.

Another objective is to provide a technical solution for improving the abrasion resistance of an optical article coated with a reflective coating, which should be valid for every residual color displayed by said reflective coating and various coating thicknesses.

Still another aim of this invention is to provide a process of manufacturing the above defined article, which could be easily integrated into the classical manufacturing chain and would avoid heating the substrate.

The inventors identified several levers that allow to boost the abrasion resistance of the optical article. They found that an increase of abrasion resistance could be obtained by optimizing the thicknesses of specific layers in the reflective coating. According to the design rules discovered by the inventors, some layer thicknesses need to be maximized, while some layer thicknesses need to be minimized.

Thus, the present invention relates to an optical article comprising a substrate having at least one main face coated with a reflective coating comprising a stack of at least one high refractive index layer having a refractive index higher than 1.55 and at least one low refractive index layer having a refractive index of 1.55 or less, wherein:

a) The reflective coating comprises at least four layers and
The outermost low refractive index layer of the reflective coating has a thickness Tho of at least 10 nm,
The outermost high refractive index layer of the reflective coating has a thickness of 75 nm or less,
The penultimate low refractive index layer of the reflective coating has a thickness Thp of at least 150 nm,
The penultimate high refractive index layer of the reflective coating has a thickness ranging from 5 nm to 90 nm,
Tho/4+Thp≥200 nm, or b) The reflective coating has three layers and
The outermost layer of the reflective coating is a low refractive index layer having a thickness of 70 nm or less,
The penultimate layer of the reflective coating is a high refractive index layer having a thickness of 50 nm or less,
The first layer of the reflective coating is a low refractive index layer having a thickness of at least 200 nm.

DESCRIPTION OF THE PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When an optical article comprises one or more surface coatings, the phrase "to deposit a coating or layer onto the optical article" means that a coating or layer is deposited onto the outermost coating of the optical article, i.e. the coating which is the closest to the air.

A coating that is "on" a side of a lens is defined as a coating that (a) is positioned over that side, (b) need not be in contact with that side, i.e., one or more intervening coatings may be disposed between that side and the coating in question (although it is preferably in contact with that side) and (c) need not cover that side completely.

The term "coating" is understood to mean any layer, layer stack or film, which may be in contact with the substrate and/or with another coating, for example a sol-gel coating or a coating made of an organic resin. A coating may be deposited or formed through various methods, including wet processing, gaseous processing, and film transfer.

The optical article prepared according to the present invention is a transparent optical article, preferably an optical lens or lens blank, and more preferably an ophthalmic lens or lens blank, which is ideally used for making a correcting or non correcting solar lens for sunglasses. The optical article may be coated on its convex main face (front side), concave main face (back/rear side), or both faces with the multilayer reflective coating according to the invention, preferably on the convex (front) main face. As used herein, the rear face of the substrate is intended to mean the face which, when using the article, is the nearest from the wearer's eye, in the cases of lenses. It is generally a concave face. On the contrary, the front face of the substrate is the face which, when using the article, is the most distant from the wearer's eye. It is generally a convex face. The optical article can also be a plano article.

Herein, the term "lens" means an organic or inorganic glass lens, comprising a lens substrate, which may be coated with one or more coatings of various natures.

The term "ophthalmic lens" is used to mean a lens adapted to a spectacle frame, for example to protect the eye and/or correct the sight. Said lens can be chosen from afocal, unifocal, bifocal, trifocal and progressive lenses. Although ophthalmic optics is a preferred field of the invention, it will be understood that this invention can be applied to optical articles of other types, such as, for example, lenses for optical instruments, in photography or astronomy, optical sighting lenses, ocular visors, optics of lighting systems, etc.

In the present description, unless otherwise specified, an optical article/material is understood to be transparent when the observation of an image through said optical article is perceived with no significant loss of contrast, that is, when the formation of an image through said optical article is obtained without adversely affecting the quality of the image. This definition of the term "transparent" can be applied to all objects qualified as such in the description, unless otherwise specified.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for a stack of one or more coatings or layers.

The substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, preferably polythiourethane resins having a refractive index of 1.60 or 1.67, polyepoxides, polyepisulfides, such as those having a refractive index of 1.74, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC) and diethylene glycol bis(allylcarbonate) polymers, in particular substrates made of polycarbonate.

Specific examples of substrates suitable to the present invention are those obtained from thermosetting polythiourethane resins, which are marketed by the Mitsui Toatsu Chemicals company as MR series, in particular MR6®, MR7® and MR8@ resins. These substrates as well as the monomers used for their preparation are especially described in the patents U.S. Pat. Nos. 4,689,387, 4,775,733, 5,059,673, 5,087,758 and 5,191,055.

Prior to depositing the reflective coating or other functional coatings, the surface of the article is usually submitted to a physical or chemical surface activating and cleaning pre-treatment, so as to improve the adhesion of the layer to be deposited, such as disclosed in WO 2013/013929. This pre-treatment is generally performed on the surface of an abrasion- and/or scratch-resistant coating (hard coat).

This pre-treatment is generally carried out under vacuum. It may be a bombardment with energetic species, for example an ion beam bombardment ("Ion Pre-Cleaning" or "IPC") or an electron beam treatment, a corona treatment, an ion spallation treatment, an ultraviolet treatment or a plasma treatment under vacuum, using typically an oxygen or an argon plasma. It may also be an acid or a base surface treatment and/or a solvent surface treatment (using water or an organic solvent) with or without ultrasonic treatment. Many treatments may be combined. Thanks to these cleaning treatments, the cleanliness of the substrate surface is optimized.

By energetic species, it is meant species with an energy ranging from 1 to 300 eV, preferably from 10 to 150 eV, and more preferably from 10 to 150 eV and most preferably from 40 to 150 eV. Energetic species may be chemical species such as ions, radicals, or species such as photons or electrons.

The preferred pre-treatment is an ion bombardment, for example by using an ion gun-generated argon ion beam. Such physical or chemical activation treatments (preferably an ionic bombardment treatment) may also be performed on the exposed surface of one or more layer(s) of the multilayer reflective coating, prior to depositing the subsequent layer of said multilayer reflective coating.

A reflective coating is a coating, deposited on the surface of an article, which improves the reflection properties of the final article in the visible range, i.e., it at least one wavelength range within the 380-780 nm region. It generally increases the reflection of light at the article/air interface over a relatively broad portion of the visible spectrum. Such coating can be used, for example, to obtain a mirror effect in sunglass lenses. Optionally, the reflective coating can increase reflection of the ultraviolet and/or infrared light.

The multilayer reflective coating of the invention comprises a stack of at least one high refractive index layer having a refractive index higher than 1.55 and at least two low refractive index layers having a refractive index of 1.55 or less.

Figure 1A:
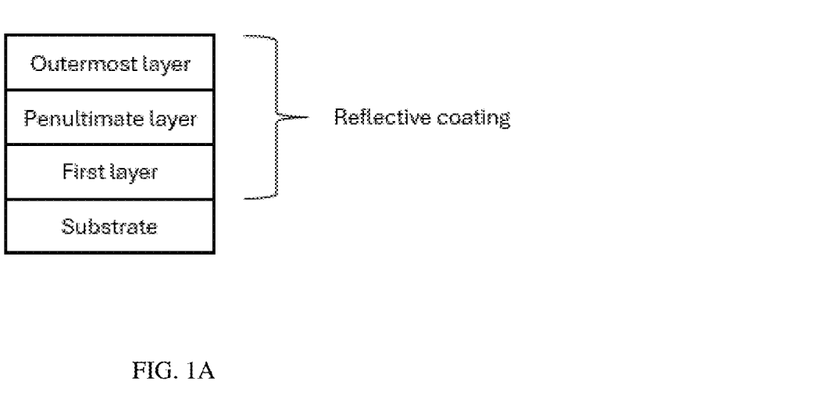
FIG. 1A illustrates the reflective coating stack according to an embodiment.

In one embodiment as illustrated in FIG. 1A, the reflective coating is a 3-layer stack comprising two layers with a low refractive index (LI) and one layer with a high refractive index (HI), alternating with each other.

Figure 1B:
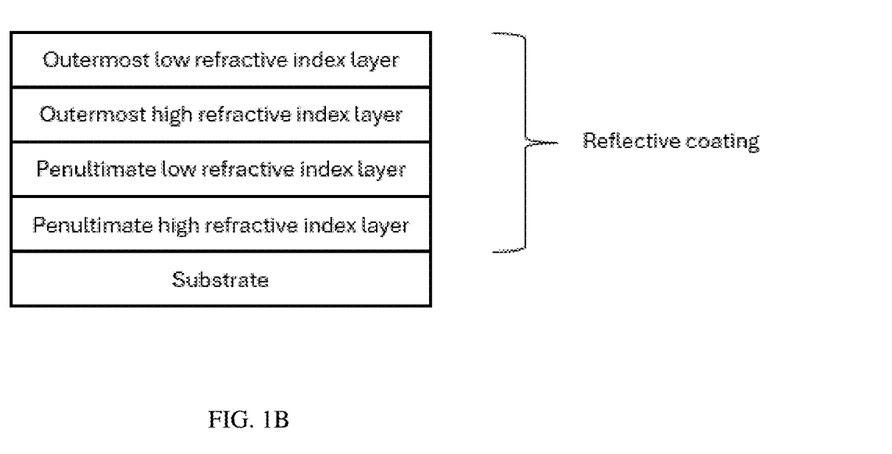
FIG. 1B illustrates the reflective coating stack according to an embodiment.

In another embodiment as illustrated in FIG. 1B, the reflective coating is a stack of at least 4 layers, e.g., a 4-layer, 5-layer or 6-layer stack, comprising at least two layers with a low refractive index (LI) and at least two layers with a high refractive index (HI), alternating with each other.

The total number of layers in the reflective coating is preferably lower than or equal to any one of the following values: 10, 8, 7, 6.

As used herein, a layer of the reflective coating is defined as having a thickness higher than or equal to 1 nm. Thus, any layer having a thickness lower than 1 nm will not be considered when counting the number of layers in the reflective coating.

In the present application, when two HI layers (or more) are deposited onto each other, they are considered as being a single HI layer having a thickness equal to the sum of the thicknesses of the individual layers, when counting the number of layers of the reflective stack. The same applies to stacks of two or more adjacent LI layers. Accordingly, HI layers and LI layers necessarily alternate with each other in the reflective stack of the present invention.

In the present application, a layer of the reflective coating is said to be a layer with a high refractive index (HI) when its refractive index is higher than 1.55, preferably higher than or equal to 1.6, even more preferably higher than or equal to 1.8 or 1.9 and most preferably higher than or equal to 2. Said HI layers preferably have a refractive index lower than or equal to 2.2 or 2.1. A layer of the reflective coating is said to be a low refractive index layer (LI) when its refractive index is lower than or equal to 1.55, preferably lower than or equal to 1.52, more preferably lower than or equal to 1.48 or 1.47. Said LI layer preferably has a refractive index higher than or equal to 1.1, more preferably higher than or equal to 1.3 or 1.35.

As is well known, reflective coatings traditionally comprise a multilayered stack composed of dielectric materials (generally one or more metal oxides) and/or sol-gel materials and/or organic/inorganic layers such as disclosed in WO 2013/098531.

The HI layer generally comprises one or more metal oxides such as, without limitation, zirconia ($ZrO_2$), titanium dioxide ($TiO_2$), a substoichiometric titanium oxide such as $Ti_3O_5$, alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), $La_2O_3$, $Nb_2O_5$, $Y_2O_3$, preferably $ZrO_2$ and $Ta_2O_5$. In some aspects of the invention, the outermost high refractive index layer(s) of the reflective coating do(es) not comprise titanium oxide. In a preferred embodiment, the reflective coating does not comprise any layer comprising $TiO_2$, or more generally, titanium oxide. As used herein, titanium oxide is intended to mean titanium dioxide or a substoichiometric titanium oxide ($TiOx$, where x<2). Titanium oxide-containing layers are indeed sensitive to photo-degradation.

Optionally, the HI layers may further contain silica or other materials with a low refractive index, provided they have a refractive index higher than 1.55 as indicated hereabove. The preferred materials include $ZrO_2$, $PrTiO_3$, $Nb_2O_5$, $Ta_2O_5$, $Ti_3O_5$, $Y_2O_3$ and mixtures thereof.

In one embodiment, the reflective coating has at least one layer comprising $Ti_3O_5$.

The LI layer is also well known and may comprise, without limitation, $SiO_2$, $MgF_2$, or a mixture of silica and alumina, especially silica doped with alumina, the latter contributing to increase the reflective coating thermal resistance. The LI layer is preferably a layer comprising at least 80% by weight of silica, more preferably at least 90% by weight of silica, relative to the layer total weight, and even more preferably consists in a silica layer.

Optionally, the LI layers may further contain materials with a high refractive index, provided the refractive index of the resulting layer is lower than or equal to 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

The reflective coating external layer, i.e., its layer that is the furthest from the substrate is generally a silica-based layer, comprising preferably at least 80% by weight of silica, more preferably at least 90% by weight of silica (for example a silica layer doped with alumina), relative to the layer total weight, and even more preferably consists of a silica layer.

Generally, the HI layers have a physical thickness ranging from 4 to 100 nm, preferably from 5 to 70 nm, more preferably from 8 to 40 nm.

Generally, the LI layers have a physical thickness ranging from 5 to 500 nm, preferably from 10 to 350 nm, more preferably from 30 to 300 nm.

The inventors have found that the abrasion and/or scratch resistance of the optical article could be improved by having a high proportion of low refractive index layers in the reflective coating as compared to high refractive index layers, in terms of thickness. Therefore, the high refractive index layers, having a refractive index higher than 1.55, preferably represent less than 20% of the thickness of the reflective coating, more preferably less than 15%. In one embodiment, the high refractive index layers preferably represent 2-40% of the thickness of the reflective coating, more preferably 4-30% or 5-20%, even more preferably 5-12% or 5-10%. In another embodiment, the low refractive index layers preferably represent 60-98% of the thickness of the reflective coating, more preferably 70-96% or 80-95%, even more preferably 88-95% or 90-95%. In the same context, the reflective coating does preferably not comprise any high refractive index layer having a thickness higher than or equal to 105 nm, 100 nm, 90 nm, 80 nm, 75 nm, 70 nm or 50 nm.

Generally, the total thickness of the reflective coating is lower than or equal to 1 micrometer, preferably lower than or equal to 800 nm, more preferably lower than or equal to 750 nm. The reflective coating total thickness is generally higher than or equal to 250 nm, preferably higher than or equal to 350 nm. In one embodiment, its thickness ranges from 300 nm to 1 μm.

The inventors discovered design rules for optimizing the abrasion and/or scratch resistance of the optical article.

When the reflective coating has three layers (i.e., its number of layers is equal to three), its outermost layer is a low refractive index layer having a thickness of 70 nm or less, its penultimate layer is a high refractive index layer having a thickness of 50 nm or less, and its first layer (last but two layer) is a low refractive index layer having a thickness of at least 200 nm.

For a 3-layer reflective coating, the thickness of the penultimate layer of the reflective coating (which should be minimized) is a very sensitive parameter, since it has a much greater influence on the abrasion resistance than the thicknesses of the other layers. The thickness of the outermost layer of the reflective coating (which should be minimized) and the thickness of the first layer of the reflective coating (which should be maximized) also allow to boost the abrasion resistance, but to a lesser extent.

In a preferred embodiment, in order to have a better abrasion resistance, the reflective coating has three layers, and its outermost layer is a low refractive index layer having a thickness of 50 nm or less, its penultimate layer is a high refractive index layer having a thickness of 50 nm or less, and its first layer is a low refractive index layer having a thickness of at least 250 nm. In another preferred embodiment, in order to have a much better abrasion resistance, the reflective coating has three layers, and its outermost layer is a low refractive index layer having a thickness of 50 nm or less, its penultimate layer is a high refractive index layer having a thickness of 40 nm or less (or 35 nm or less), and its first layer is a low refractive index layer having a thickness of at least 250 nm.

When the reflective coating has three layers, its first layer preferably has a thickness ranging from 200 nm to 400 nm, more preferably from 250 nm to 350 nm; and/or its penultimate layer preferably has a thickness ranging from 20 to 50 nm, preferably from 30 to 40 nm; and/or its outermost layer preferably has a thickness ranging from 20 to 50 nm, preferably from 30 to 40 nm.

When the reflective coating has four layers or more, its outermost low refractive index layer has a thickness Tho of at least 10 nm, its outermost high refractive index layer has a thickness of 75 nm or less, its penultimate low refractive index layer has a thickness Thp of at least 150 nm, its penultimate high refractive index layer has a thickness ranging from 5 nm to 90 nm, and $Tho/4+Thp \geq 200$ nm.

By outermost high or low refractive index layer of the reflective coating, it is meant the layer of the reflective coating that is the furthest from the substrate. By penultimate high or low refractive index layer of the reflective coating, it is meant the layer of the reflective coating that is the furthest from the substrate but positioned just before the outermost high or low refractive index layer of the reflective coating as defined previously.

For a reflective coating having four layers or more, it has been found that the abrasion resistance could be controlled by adjusting the thicknesses of the four last layers, i.e., the four layers that are the most distant from the substrate. The thickness of the penultimate low refractive index layer of the reflective coating (which should be maximized) is a very sensitive parameter, having a great influence on the abrasion resistance, while the thickness of the penultimate high refractive index layer (which should be minimized) is a sensitive parameter. The thickness of the outermost low refractive index layer of the reflective coating (which should be maximized) and the thickness of the outermost high refractive index layer of the reflective coating (which should be minimized) also allow to boost the abrasion resistance, but to a lesser extent.

In a preferred embodiment, Tho/4+Thp preferably ranges from 210 to 500 nm, more preferably from 225 to 425 nm, even more preferably from 250 to 400 nm. Indeed, the inventors have found that the thickness of the penultimate low refractive index layer had a much greater influence on the abrasion resistance of the optical article than the thickness of the outermost low refractive index layer.

In a preferred embodiment, in order to have a better abrasion resistance, the reflective coating has four layers or more, and its outermost low refractive index layer has a thickness of at least 200 nm, its outermost high refractive index layer has a thickness of 40 nm or less, its penultimate low refractive index layer has a thickness of at least 220 nm, and its penultimate high refractive index layer has a thickness ranging from 5 nm to 40 nm. In another preferred embodiment, in order to have a much better abrasion resistance, the reflective coating has four layers or more, and its outermost low refractive index layer has a thickness of at least 230 nm, its outermost high refractive index layer has a thickness of 25 nm or less, its penultimate low refractive index layer has a thickness of at least 300 nm, and its penultimate high refractive index layer has a thickness ranging from 5 nm to 20 nm.

When the reflective coating has four layers or more, its outermost low refractive index layer preferably has a thickness ranging from 10 to 350 nm, more preferably from 10 to 300 nm, even more preferably from 130 to 300 nm, 150 to 300 nm or 200 to 300 nm; and/or its outermost high refractive index layer preferably has a thickness ranging from 10 to 100 nm, more preferably from 10 to 75 nm, even more preferably from 12 to 40 nm or 12 to 30 nm; and/or its penultimate low refractive index layer preferably has a thickness ranging from 150 to 400 nm or 175 to 400 nm, more preferably from 175 to 350 nm or 180 to 325 nm; and/or its penultimate high refractive index layer preferably has a thickness ranging from 5 to 100 nm, more preferably from 5 to 75 nm, even more preferably from 5 to 55 nm, 10 to 50 nm or 10 to 40 nm.

When the reflective coating has four layers or more, its outermost low refractive index layer preferably has a thickness of at least 70 nm. Its penultimate low refractive index layer is preferably thicker than its outermost low refractive index layer.

In a general manner, the outermost layer of the reflective coating is preferably a low refractive index layer.

At least one thin (1 nm to several nm thickness, typically 1-6 nm) adhesion layer can be applied on the substrate before applying the reflective coating, such as a chromium based or a niobium based layer or any other layer known by the person skilled in the art to improve adhesion.

The optical article of the invention may be made antistatic, that is to say not to retain and/or develop a substantial static charge, by incorporating at least one electrically conductive layer into the stack present on the surface of the article, preferably in the reflective coating.

The ability for a lens to evacuate a static charge obtained after rubbing with a piece of cloth or using any other procedure to generate a static charge (charge applied by corona . . . ) may be quantified by measuring the time it takes for said charge to dissipate. Thus, antistatic lenses have a discharge time of about a few hundred milliseconds, preferably 500 ms or less, whereas it is of about several tens of seconds for a static lens. In the present application, discharge times are measured according to the method exposed in the French application FR 2943798.

As used herein, an "electrically conductive layer" or an "antistatic layer" is intended to mean a layer which, due to its presence on the surface of a substrate, decreases the ability of the optical article to attract dust/particles due to charge accumulation. Preferably, when applied onto a non-antistatic substrate (i.e. having a discharge time higher than 500 ms), the antistatic layer enables the optical article not to retain and/or develop a substantial static charge, for example to have a discharge time of 500 ms or less after a static charge has been applied onto the surface thereof, so that small dust is prevented from adhering to the optical article due to prevention of static effects.

The electrically conductive layer may be located at various places in the stack, generally in or in contact with the reflective coating, provided that the reflective properties thereof are not affected. It is preferably located between two layers of the reflective coating (typically two LI layers), and/or is preferably adjacent to a layer with a high refractive index of such reflective coating. In an embodiment, the electrically conductive layer is located immediately under a layer with a low refractive index of the reflective coating, most preferably is the penultimate layer of the reflective coating by being located immediately under the LI external layer of the reflective coating.

The electrically conductive layer should be thin enough not to alter the transparency of the reflective coating. The electrically conductive layer is preferably made from an electrically conductive and highly transparent material, generally an optionally doped metal oxide. In this case, the thickness thereof preferably ranges from 1 to 15 nm, more preferably from 1 to 10 nm, ideally from 2 to 8 nm. Preferably, the electrically conductive layer comprises an optionally doped metal oxide, selected from indium, tin, zinc oxides and mixtures thereof. Tin-indium oxide ($In_2O_3$: Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner because of its low thickness, to obtaining reflective properties and typically represents a layer with a high refractive index in said coating. This is the case for those layers made from an electrically conductive and highly transparent material such as ITO or $SnO_2$ layers. Accordingly, when it is present, the electrically conductive layer is preferably the outermost high refractive index layer of the reflective coating, or a member of the outermost high refractive index layer of the reflective coating when it is adjacent to one or more high refractive index layers.

The electrically conductive layer may be deposited according to any suitable method, for example by vacuum evaporation deposition, preferably ion-beam-assisted (IAD, described below) to increase its transparence, or by means of cathode sputtering.

The electrically conductive layer may also be a very thin layer of a noble metal (Ag, Au, Pt, etc.) typically smaller than 1 nm in thickness and preferably less than 0.5 nm in thickness.

The various layers of the reflective coating are preferably deposited by vapor phase deposition, under vacuum, in a vacuum deposition chamber, according to any of the following methods: i) by evaporation, optionally under ion beam assistance; ii) by ion-beam spraying; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is evaporation under vacuum. Preferably, the deposition of each of the above-mentioned layers is conducted by evaporation under vacuum. Such a process does advantageously avoid heating the substrate, which is particularly interesting for coating heat-sensitive substrates such as organic glasses.

A treatment step with energetic species such as previously defined may also be carried out, simultaneously whilst depositing one or more of the various layers of the reflective coating. In particular, working under ion assistance enables to pack said layers while they are being formed, and increases their compression and refractive index. The use of ion assistance during the deposition of a layer produces a layer that is structurally different from a layer deposited without ion assistance.

The ion assisted deposition method or IAD is notably described in US patent application 2006/017011 and in U.S. Pat. No. 5,268,781. Vapor phase deposition under ion assistance comprises depositing onto a substrate a layer of material by simultaneously bombarding by means of an ion beam said layer while it is being formed, and preferably under ion bombardment achieved by means of an ion gun, where ions are particles composed of gas atoms from which one or more electron(s) is or are extracted. The ion bombardment leads to an atomic rearrangement in the coating being formed, which increases its density. The IAD not only allows an improvement of the deposited layer adhesion, but also an increase in their refractive index. It does preferably consist of bombarding the surface to be treated with oxygen ions. Other ionized gases may be used, either combined with oxygen, or not, for example argon, nitrogen, in particular a mixture of $O_2$ and argon according to a volume ratio ranging from 2:1 to 1:2.

According to an embodiment of the present invention, the deposition of all the high refractive index layer of the reflective coating having a refractive index higher than 1.55 has been carried out under ionic assistance, i.e., those layers have been deposited under the assistance of a source of ions during the formation of those layers.

The outermost low refractive index layer of the reflective coating is preferably deposited without ionic assistance, preferably without concomitant treatment with energetic species. In another embodiment, the low refractive index layers of the reflective coating are deposited without ionic assistance, preferably without concomitant treatment with energetic species.

In one embodiment, no layer of the reflective coating is deposited under ion assistance (preferably no layer of the reflective coating is deposited under concomitant treatment with energetic species), except the electrically conductive layer(s), if present in the reflective coating.

Optionally, the deposition of one or more of said layers is performed by supplying (a supplementary) gas during the deposition step of the layer in a vacuum chamber, such as disclosed in US 2008/206470. Concretely, an additional gas such as a rare gas, for example argon, krypton, xenon, neon; a gas such as oxygen, nitrogen, or mixtures of two gases or more amongst these, is or are introduced into the vacuum deposition chamber while the layer is being deposited. The gas employed during this deposition step is not an ionized gas, more preferably not an activated gas.

This gas supply makes it possible to regulate the pressure and differs from an ionic bombardment treatment, such as ion assistance. It generally enables the limitation of stress in the reflective coating and to reinforce the adhesion of the layers. When such deposition method is used, which is called deposition under gas pressure regulation, it is preferred to work under an oxygen atmosphere (so called "passive oxygen"). The use of an additional gas supply during the deposition of a layer produces a layer that is structurally different from a layer deposited without additional gas supply.

In an embodiment of the invention, the deposition of the sub-layer is performed in a vacuum chamber under a pressure lower than any one of the following values: $1.6 \times 10^{-4}$ mBar, $1.5 \times 10^{-4}$ mBar, $1.4 \times 10^{-4}$ mBar, $1.3 \times 10^{-4}$ mBar, $1.2 \times 10^{-4}$ mBar, $1.1 \times 10^{-4}$ mBar, preferably lower than $10^{-4}$ mBar, more preferably lower than $8.10^{-5}$ mBar and even better lower than any one of the following values $7.10^{-5}$ mBar, $6.10^{-5}$ mBar, $5.10^{-5}$ mBar, $4.10^{-5}$ mBar, $3.10^{-5}$ mBar. Typically, in this preferred embodiment, the pressure is around $1.6 \times 10^{-5}$ mBar.

The reflective coating may be deposited directly onto a bare substrate. In some applications, it is preferred that the main surface of the substrate be coated with one or more functional coatings improving its optical and/or mechanical properties, prior to depositing the reflective coating of the invention. These functional coatings traditionally used in optics may be, without limitation, an impact-resistant primer layer, an abrasion- and/or scratch-resistant coating (hard coat), a polarized coating, an antistatic coating, a photochromic coating, a tinted coating or a stack made of two or more of such coatings.

The impact-resistant primer coating which may be used in the present invention can be any coating typically used for improving impact resistance of a finished optical article. By definition, an impact-resistant primer coating is a coating which improves the impact resistance of the finished optical article as compared with the same optical article but without the impact-resistant primer coating.

Typical impact-resistant primer coatings are (meth)acrylic based coatings and polyurethane based coatings. In particular, the impact-resistant primer coating according to the invention can be made from a latex composition such as a poly(meth)acrylic latex, a polyurethane latex or a polyester latex.

Preferred primer compositions include compositions based on thermoplastic polyurethanes, such as those described in the patents JP 63-141001 and JP 63-87223, poly(meth)acrylic primer compositions, such as those described in the patents U.S. Pat. Nos. 5,015,523 and 6,503,631, compositions based on thermosetting polyurethanes, such as those described in the patent EP 0404111 and compositions based on poly(meth)acrylic latexes or polyurethane latexes, such as those described in the patents U.S. Pat. No. 5,316,791 and EP 0680492. Preferred primer compositions are compositions based on polyurethanes and compositions based on latexes, in particular polyurethane latexes, poly(meth)acrylic latexes and polyester latexes, as well as their combinations. In one embodiment, the impact-resistant primer comprises colloidal fillers.

Poly(meth)acrylic latexes are latexes based on copolymers essentially made of a (meth)acrylate, such as for example ethyl(meth)acrylate, butyl(meth)acrylate, methoxyethyl (meth)acrylate or ethoxyethyl(meth)acrylate, with at least one other co-monomer in a typically lower amount, such as for example styrene.

Commercially available primer compositions suitable for use in the invention include the Witcobond® 232, Witcobond® 234, Witcobond® 240, Witcobond® 242 compositions (marketed by BAXENDEN CHEMICALS), Neorez® R-962, Neorez® R-972, Neorez® R-986 and Neorez® R-9603 (marketed by ZENECA RESINS), and Neocryl® A-639 (marketed by DSM coating resins).

The thickness of the impact-resistant primer coating, after curing, typically ranges from 0.05 to 30 μm, preferably 0.2 to 20 μm and more particularly from 0.5 to 10 μm, and even better 0.6 to 5 μm or 0.6 to 3 μm, and most preferably 0.8 to 1.5 μm.

The impact-resistant primer coating is preferably in direct contact with an abrasion- and/or scratch-resistant coating.

The abrasion- and/or scratch-resistant coating may be any layer traditionally used as an anti-abrasion and/or anti-scratch coating in the field of optical lenses.

The abrasion- and/or scratch-resistant coatings are preferably hard coatings based on poly(meth)acrylates or silanes, generally comprising one or more mineral fillers intended to increase the hardness and/or the refractive index of the coating once cured.

Abrasion- and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings that are recommended for the present invention include coatings based on epoxysilane hydrolyzates such as those described in the patents EP 0614957, U.S. Pat. Nos. 4,211,823 and 5,015,523.

A preferred abrasion- and/or scratch-resistant coating composition is disclosed in the patent EP 0614957, in the name of the applicant. It comprises a hydrolyzate of epoxy trialkoxysilane and dialkyl dialkoxysilane, colloidal silica and a catalytic amount of an aluminum-based curing catalyst such as aluminum acetylacetonate, the rest being essentially composed of solvents traditionally used for formulating such compositions. Preferably, the hydrolyzate used is a hydrolyzate of γ-glycidoxypropyltrimethoxysilane (GLYMO) and dimethyldiethoxysilane (DMDES).

The abrasion- and/or scratch-resistant coating composition may be deposited by known methods and is then cured, preferably using heat or ultraviolet radiation. The thickness of the (cured) abrasion- and/or scratch-resistant coating does generally vary from 2 to 10 μm, preferably from 3 to 5 μm.

The optical article according to the invention may also comprise coatings formed on the reflective coating and capable of modifying the surface properties thereof, such as a hydrophobic and/or oleophobic coating (antifouling top coat). These coatings are preferably deposited onto the outer layer of the reflective coating. Generally, their thickness is lower than or equal to 10 nm, does preferably range from 1 to 10 nm, more preferably from 1 to 5 nm. Antifouling top coats are generally coatings of the fluorosilane or fluorosilazane type, preferably comprising fluoropolyether moieties and more preferably perfluoropolyether moieties. More detailed information on these coatings is disclosed in WO 2012076714.

Instead of a hydrophobic coating, a hydrophilic coating may be used which provides anti-fog properties (anti-fog coating), or a precursor of an anti-fog coating which provides anti-fog properties when associated with a surfactant. Examples of such anti-fog precursor coatings are described in the patent application WO 2011/080472.

The additional coatings such as primers, hard coats and antifouling top coats may be deposited onto a main face of the substrate using methods known in the art, including spin-coating, dip-coating, spray-coating, evaporation, sputtering, chemical vapor deposition and lamination.

Typically, an optical article according to the invention comprises a substrate that is successively coated with an impact-resistant primer layer, an anti-abrasion and/or scratch-resistant layer, a reflective coating according to the invention, and a hydrophobic and/or oleophobic coating, or a hydrophilic coating that provides anti-fog properties, or an anti-fog precursor coating.

Due to the specific design of the reflective coating according to the invention, the optical articles of the invention exhibit a high value of abrasion resistance measured according to the Bayer ASTM (Bayer sand) operating protocol described hereafter, i.e., in accordance with the ASTM F735-81 standard.

According to the present invention, the optical article, the main face of which, preferably the front face, is covered by the reflective stack of the invention, exhibits in one embodiment a Bayer value measured in accordance with the ASTM F735-81 standard (sand Bayer value) higher than or equal to 5.5, preferably higher than or equal to any one of the following value: 6, 6.5, 7, 7.5, 8. Thus, the present invention provides optical articles with a high abrasion resistance, since typical sand Bayer values for optical articles are lower than 5, even lower than 3.

In one embodiment, the optical article according to the invention does not absorb in the visible or not much, which means, in the context of the present application, that its relative light transmission factor in the visible spectrum Tv is higher than or equal to any one of the following values: 87%, 88%, 89%, 90%, 92%, 95%, 96%, 97%. Said Tv factor preferably ranges from 75% to 95% or 97%, more preferably from 80% to 94%, even better from 85% to 93%. In another embodiment, Tv ranges from 87% to 92%.

The Tv factor, also called "luminous transmission" of the system, is such as defined in ISO standard 13666:1998 and is measured accordingly to standard ISO 8980-3. It is defined as the average in the 380-780 nm wavelength range that is weighted according to the sensitivity of the eye at each wavelength of the range and measured under D65 illumination conditions (daylight).

The "mean light reflection factor," noted $R_v$, also called "luminous reflection", is such as defined in the ISO 13666: 1998 standard, and measured in accordance with the ISO 8980-4 standard (for an angle of incidence lower than 17°, typically of 15°), i.e., this is the weighted spectral reflection average over the whole visible spectrum between 380 and 780 nm.

The mean light reflection factor Ry of the face of the article coated by an reflective coating according to the invention is preferably higher than 2.5%, preferably higher than or equal to 4%, 5% or 8%, more preferably higher than or equal to 10%, even more preferably higher than or equal to 15% or 20%, on said face of the article.

The colorimetric coefficients C* and h of the optical article of the invention in the international colorimetric CIE L*a*b* are calculated between 380 and 780 nm, taking the standard illuminant D65 and the observer into account (angle of incidence: 15°). The observer is a "standard observer" (10°) as defined in the international colorimetric system CIE L*a*b*.

The colorimetric coefficients of the lenses of the invention have a good robustness. The robustness σh of the optical article, defined in WO 2015/000534, is satisfactory, and preferably lower than or equal to 8°, more preferably lower than or equal to 7.5°, for a hue angle h corresponding to green.

It is possible to prepare reflective coatings without limitation as regards their hue angle h (0° to) 360°, which relates to the residual color displayed by said reflective coating, and preferably ranges from 40° to 300°, more preferably from 50° to 290°. In some embodiments, the optical article has a hue angle (h) ranging from 240° to 300°, preferably from 250° to 290°, more preferably from 260° to 280°, thus resulting in a perceived residual reflected color blue to violet, preferably close to violet. In another embodiment, the optical article has a hue angle (h) higher than or equal to 135°, more preferably higher than or equal to 140° and better ranging from 140° to 160°, thus resulting in an reflective coating having a green reflection. In another embodiment, the optical article has a hue angle (h) ranging from 40° to 90°, preferably 50° to 90°, better 50° to 70°, thus resulting in an reflective coating having a gold reflection. It is possible to attain all the residual colors by adapting the number of layers of the reflective coating and the refractive index of the layers, in particular by increasing the number of layers and/or the refractive index of the high refractive index layers.

In some aspects of the invention, the reflective coating has a chroma (C*) that is lower than 15 (for an angle of incidence of) 15°, more preferably lower than 13. Obtaining low residual color intensity (chroma) articles is preferable with respect to wearer's comfort viewpoint, in the cases of lenses, as well as obtaining a pleasingly aesthetic metallic-like neutral aspect in reflection.

The invention further relates to a method of manufacturing an optical article such as described hereabove, comprising:

providing an optical article comprising a substrate having at least one main face, depositing onto a main surface of the substrate a reflective coating as described previously, comprising a stack of at least one high refractive index layer having a refractive index higher than 1.55 and at least one low refractive index layer having a refractive index of 1.55 or less.

In some embodiments, the exposed surface of the substrate has been submitted to an ionic bombardment treatment prior to depositing said reflective coating, and/or the exposed surface of at least one layer of the multilayer reflective coating has been submitted to an ionic bombardment treatment prior to depositing the subsequent layer of said multilayer reflective coating.

In one embodiment, the present optical article is prepared by forming on the substrate a primer coating and/or an abrasion- and/or scratch-resistant coating in a first manufacturing site, while the other coatings are formed in a second manufacturing site.

The following examples illustrate the present invention in a more detailed, but non-limiting manner. Unless stated otherwise, all thicknesses disclosed in the present application relate to physical thicknesses. The percentages given in the tables are weight percentages. Unless otherwise specified, the refractive indexes referred to in the present invention are expressed at 20-25° C. for a wavelength of 550 nm.

EXAMPLES

1. General Procedures

The articles employed in the examples comprise a 65 mm-diameter polythiourethane MR8® lens substrate (from Mitsui Toatsu Chemicals Inc., refractive index=1.59), with a power of −2.00 diopters and a thickness of 1.2 mm, coated on its convex face with the impact resistant primer coating based on a W234™ polyurethane material disclosed in the experimental part of WO 2010/109154 (modified to have a refractive index of 1.6 by addition of high refractive index colloids), the abrasion- and scratch-resistant coating (hard coat) disclosed in example 3 of EP 0614957 (modified to have a refractive index of 1.6 rather than 1.5 by adding high refractive index colloids), a reflective coating, and the antifouling coating disclosed in the experimental section of patent application WO 2010/109154, obtained by evaporation under vacuum of the Optool DSX® compound marketed by Daikin Industries (thickness: from 2 to 5 nm).

The various layers were deposited without heating the substrates, by vacuum evaporation, optionally assisted (IAD) during the deposition by a beam of oxygen and possibly argon ions, when specified (evaporation source: electron gun), and optionally under pressure regulation by supplying (passive) $O_2$ gas into the chamber, where indicated.

The vacuum evaporation device that made it possible to deposit the various reflective layers was a Leybold LAB1100+ vacuum coater having two systems for evaporating materials, an electron gun evaporation system and a thermal evaporator (Joule-effect evaporation system), and a KRI EH 1000 F ion gun (from Kaufman & Robinson Inc.), for use in the preliminary phase of preparation of the surface of the substrate by argon ion bombardment (IPC) and in the ion-assisted deposition (IAD) of the layers.

2. Preparation of the Optical Articles

The lenses were placed on a carrousel provided with circular openings intended to accommodate the lenses to be treated, the concave side facing the evaporation sources and the ion gun.

The method for producing optical articles comprises introducing the lens substrate provided with the primer and abrasion-resistant coatings into a vacuum deposition chamber, conducting a pumping step until a high vacuum was created, followed by an ion gun conditioning step (IGC, such as disclosed in FR 2957454, $3.5 \times 10^{-5}$ mBar as starting pressure, 140 V, 3.5 A, argon, 60 seconds), a substrate surface activation step using a bombardment with an argon ion beam (IPC) with an average pressure of $1.8 \times 10^{-4}$ mBar (the ion gun was set to an anode current discharge of 1.7 A, 110 V, 60 seconds, gas flow: 10 sccm of argon), stopping the ionic irradiation, and then successively evaporating the required number of layers (reflection coating layers and antifouling coating) at a rate ranging from 2 to 3 nm/s (0.4 nm/s for the antifouling coating), and lastly a ventilation step. High refractive index layers were obtained by evaporating $ZrO_2$ pellets without $O_2$ pressure or the substoichiometric titanium oxide ("stabilized $Ti_3O_5$") supplied by Merck.

The deposition conditions of a representative optical article (example 4) were as follows: a deposition step of a HI layer ($ZrO_2$) under a pressure of 6.105 mBar, a deposition step of a LI layer ($SiO_2$) under a pressure of $2.4 \times 10^{-5}$ mBar, a deposition step of a HI layer ($ZrO_2$) under a pressure of $6.1 \times 10^{-5}$ mBar, a surface activation step of this $ZrO_2$ layer using an argon ion beam (same treatment as IPC already conducted directly on the substrate, except for the treatment time: 30 seconds, the average pressure: $1.6 \times 10^{-4}$ mBar and the anode tension: 125 V), a deposition step of a LI layer ($SiO_2$) under a pressure of $1.8 \times 10^{-5}$ mBar, and lastly a deposition step of an Optool DSX® layer. All the layers were deposited without adding gas in the vacuum chamber during deposition.

3. Testing Methods

The following test procedures were used to evaluate the optical articles prepared according to the present invention. Several samples for each system were prepared for measurements and the reported data were calculated with the average of the different samples.

Colorimetric measurements (reflective factor Rv, measured in reflection) of the face coated with the stack of the invention were carried out with a Zeiss spectrophotometer, taking into account the standard illuminant D65, and the standard observer 10°. They are provided for an angle of incidence of 15°.

Abrasion resistance was determined as disclosed in WO 2012/173596. Specifically, abrasion resistance was measured by means of the sand Bayer test, in accordance with the ASTM F735-81 standard, 1 week after production of the article.

The inventors noticed that the Bayer value of the article is decreasing after it has been manufactured. It is preferable to measure the value after stabilization, e.g., at least 1 week after it has been manufactured. In this application, the Bayer values for the examples have been measured 1 week after the articles have been manufactured.

4. Results

The structural characteristics, optical and mechanical performances of the ophthalmic lenses obtained in the examples are detailed hereunder. The thickness mentioned is the total thickness of the reflective stack.

| Example 1 (comparative) | |
|---|---|
| Substrate + primer/hard coat | |
| $ZrO_2$ | 4 nm |
| $SiO_2$ | 164 nm |
| $ZrO_2$ (a) | 32 nm |
| $SiO_2$ | 176 nm |
| Top Coat | |
| Sand Bayer | 4.8 |
| Thickness (nm) | 376 |
| HI layers % thickness | 9.6% |
| Tho/4 + Thp | 208 nm |

| Example 2 | |
|---|---|
| Substrate + primer/hard coat | |
| $ZrO_2$ | 8 nm |
| $SiO_2$ | 260 nm |
| $ZrO_2$ (a) | 36 nm |
| $SiO_2$ | 184 nm |
| Top Coat | |
| Sand Bayer | 5.5 |
| Thickness (nm) | 488 |
| HI layers % thickness | 9% |
| Tho/4 + Thp | 306 nm |

| Example 3 | |
|---|---|
| Substrate + primer/hard coat | |
| $ZrO_2$ | 20 nm |
| $SiO_2$ | 228 nm |
| $ZrO_2$ (a) | 32 nm |
| $SiO_2$ | 192 nm |
| Top Coat | |
| Sand Bayer | 5.8 |
| Thickness (nm) | 472 |
| HI layers % thickness | 11% |
| Tho/4 + Thp | 276 nm |

| Example 4 | |
|---|---|
| Substrate + primer/hard coat | |
| $ZrO_2$ | 48 nm |
| $SiO_2$ | 184 nm |
| $ZrO_2$ (a) | 12 nm |
| $SiO_2$ | 264 nm |
| Top Coat | |
| Sand Bayer | 7.0 |
| Thickness (nm) | 508 |
| HI layers % thickness | 11.8% |
| Tho/4 + Thp | 250 nm |

| Example 5 | |
|---|---|
| Substrate + primer/hard coat | |
| $ZrO_2$ | 32 nm |
| $SiO_2$ | 196 nm |
| $ZrO_2$ (a) | 28 nm |
| $SiO_2$ | 248 nm |
| Top Coat | |
| Sand Bayer | 5.5 |
| Thickness (nm) | 504 |
| HI layers % thickness | 11.9% |
| Tho/4 + Thp | 258 nm |

| Example 6 (comparative) | |
|---|---|
| Substrate + primer/hard coat | |
| $SiO_2$ | 296 nm |
| $ZrO_2$ (a) | 32 nm |
| $SiO_2$ | 248 nm |
| Top Coat | |
| Sand Bayer | 4.2 |
| Thickness (nm) | 576 |
| HI layers % thickness | 5.6% |

| Example 7 | |
|---|---|
| Substrate + primer/hard coat | |
| $ZrO_2$ | 12 nm |
| $SiO_2$ | 300 nm |
| $ZrO_2$ (a) | 24 nm |
| $SiO_2$ | 240 nm |
| Top Coat | |
| Sand Bayer | 7.1 |
| Thickness (nm) | 576 |
| HI layers % thickness | 6.3% |
| Tho/4 + Thp | 360 nm |

| Example 8 | |
|---|---|
| Substrate + primer/hard coat | |
| $SiO_2$ | 150 nm |
| $ZrO_2$ | 12 nm |
| $SiO_2$ | 300 nm |
| $ZrO_2$ (a) | 24 nm |
| $SiO_2$ | 240 nm |

| Top Coat | |
|---|---|
| Sand Bayer | 7.1 |
| Thickness (nm) | 726 |
| HI layers % thickness | 5% |
| Tho/4 + Thp | 360 nm |

Example 9

| Substrate + primer/hard coat | |
|---|---|
| $ZrO_2$ | 40 nm |
| $SiO_2$ | 276 nm |
| $ZrO_2$ (a) | 16 nm |
| $SiO_2$ | 248 nm |

| Top Coat | |
|---|---|
| Sand Bayer | 7.0 |
| Thickness (nm) | 580 |
| HI layers % thickness | 9.7% |
| Tho/4 + Thp | 338 nm |

Example 10

| Substrate + primer/hard coat | |
|---|---|
| $ZrO_2$ | 48 nm |
| $SiO_2$ | 276 nm |
| $ZrO_2$ (a) | 68 nm |
| $SiO_2$ | 12 nm |

| Top Coat | |
|---|---|
| Sand Bayer | 5.8 |
| Thickness (nm) | 404 |
| HI layers % thickness | 28.7% |
| Tho/4 + Thp | 279 nm |

Example 11

| Substrate + primer/hard coat | |
|---|---|
| $SiO_2$ | 300 nm |
| $ZrO_2$ (a) | 36 nm |
| $SiO_2$ | 36 nm |

| Top Coat | |
|---|---|
| Sand Bayer | 8.4 |
| Thickness (nm) | 372 |
| HI layers % thickness | 9.7% |

Example 12 (comparative)

| Substrate + primer/hard coat | |
|---|---|
| $SiO_2$ | 284 nm |
| $ZrO_2$ (a) | 68 nm |
| $SiO_2$ | 132 nm |

| Top Coat | |
|---|---|
| Sand Bayer | 3.5 |
| Thickness (nm) | 484 |
| HI layers % thickness | 14% |

Example 13 (comparative)

| Substrate + primer/hard coat | |
|---|---|
| $ZrO_2$ | 24 nm |
| $SiO_2$ | 52 nm |
| $ZrO_2$ (a) | 82 nm |
| $SiO_2$ | 143 nm |

| Top Coat | |
|---|---|
| Sand Bayer | 3.5 |
| Thickness (nm) | 301 |
| HI layers % thickness | 35.2% |
| Tho/4 + Thp | 88 nm |

Example 14 (comparative)

| Substrate + primer/hard coat | |
|---|---|
| $ZrO_2$ | 100 nm |
| $SiO_2$ | 100 nm |
| $ZrO_2$ | 100 nm |
| $SiO_2$ | 140 nm |
| $ZrO_2$ (a) | 10 nm |
| $SiO_2$ | 100 nm |

| Top Coat | |
|---|---|
| Sand Bayer | 4.0 |
| Thickness (nm) | 550 |
| HI layers % thickness | 38.2% |
| Tho/4 + Thp | 165 nm |

Example 15 (comparative)

| Substrate + primer/hard coat | |
|---|---|
| $ZrO_2$ | 104 nm |
| $SiO_2$ | 59 nm |
| $ZrO_2$ | 64 nm |
| $SiO_2$ | 103 nm |
| $ZrO_2$ (a) | 30 nm |
| $SiO_2$ | 219 nm |

| Top Coat | |
|---|---|
| Sand Bayer | 5.2 |
| Thickness (nm) | 579 |
| HI layers % thickness | 34.2% |
| Tho/4 + Thp | 158 nm |

Example 16 (comparative)

| Substrate + primer/hard coat | |
|---|---|
| $SiO_2$ (b) | 150 nm |
| $ZrO_2$ (a) | 17 nm |
| $SiO_2$ | 34 nm |

| Top Coat | |
|---|---|
| Sand Bayer | 6.9 |
| Thickness (nm) | 201 |
| HI layers % thickness | 8.5% |

Example 17

| Substrate + primer/hard coat | |
|---|---|
| $Ti_3O_5$ | 6 nm |
| $SiO_2$ | 59.82 nm |
| $Ti_3O_5$ | 7.25 nm |
| $SiO_2$ | 273.55 nm |
| $Ti_3O_5$ | 52.76 nm |
| $SiO_2$ | 12 nm |

| Top Coat | |
|---|---|
| Sand Bayer | 6.4 |
| Thickness (nm) | 411.38 |
| HI layers % thickness | 16% |
| Tho/4 + Thp | 276.55 nm |

-continued

Example 18 (comparative)

Substrate + primer/hard coat

| | |
|---|---|
| Ti₃O₅ | 8 nm |
| SiO₂ | 57.81 nm |
| Ti₃O₅ | 9.5 nm |
| SiO₂ | 135.13 nm |
| Ti₃O₅ | 25.77 nm |
| SiO₂ | 187.26 nm |

Top Coat

| | |
|---|---|
| Sand Bayer | 5.2 |
| Thickness (nm) | 423.47 |
| HI layers % thickness | 10.2% |
| Tho/4 + Thp | 181.94 nm |

(a) Ionic bombardment treatment of the layer surface before depositing the next layer.
(b) Oxygen supply during deposition.

Optical articles having a reflective stack with thicknesses according to the invention exhibit better abrasion resistance than comparative articles, while keeping a similar level of reflection performance. For instance, the article of example 11 exhibits a better abrasion resistance than the article of example 16, for a same color of reflected light (silver). Comparative articles, which do not comply with the rules of design mentioned in the present application, exhibit quite low Bayer values.

A comparison of examples 7 and 8 shows that adding an additional 150-nm thick layer of silica as a ground layer to a 4-layer stack has no effect on the sand Bayer performance. This could be explained by the fact that the reflective coating was already sufficiently thick (almost 600 nm thick).

Some Bayer values obtained are higher than or equal to 7, which indicates a very high level of abrasion resistance. It should be noted that a difference of 1-2 points in the Bayer values is highly significant.

The invention claimed is:

1. An optical article comprising:
   a substrate having at least one main face coated with a reflective coating in the visible range comprising a stack of at least one high refractive index layer having a refractive index greater than 1.55 and at least one low refractive index layer having a refractive index of 1.55 or less, the refractive indexes being expressed for a wavelength of 550 nm,
   wherein the reflective coating comprises at least four layers, and
      the outermost low refractive index layer of the reflective coating has a physical thickness Tho of at least 10 nm,
      the outermost high refractive index layer of the reflective coating has a physical thickness of 75 nm or less,
      the penultimate low refractive index layer of the reflective coating, in a direction moving away from the substrate, has a physical thickness Thp of at least 150 nm,
      the penultimate high refractive index layer of the reflective coating, in the direction moving away from the substrate, has a physical thickness ranging from 5 nm to 90 nm, and
      Tho/4+Thp≥200 nm, or
   wherein the reflective coating has exactly three layers, and
      the outermost layer of the reflective coating is a low refractive index layer having a physical thickness of 70 nm or less,
      the penultimate layer of the reflective coating, in the direction moving away from the substrate, is a high refractive index layer having a physical thickness of 50 nm or less, and
      the first layer of the reflective coating is a low refractive index layer having a physical thickness of at least 200 nm, and
   wherein the penultimate low refractive index layer of the reflective coating is the penultimate low refractive index layer within the low refractive index layers of the reflective coating,
   wherein the penultimate high refractive index layer of the reflective coating is the penultimate high refractive index layer within the high refractive index layers of the reflective coating,
   wherein high refractive index layers and low refractive index layers alternate with each other in the reflective coating, and
   wherein, when determining the number of layers of the reflective coating, two or more adjacent high refractive index layers form a single high refractive index layer having a thickness equal to the sum of the thicknesses of individual layers of the two or more adjacent high refractive index layers, and two or more adjacent low refractive index layers are a single low refractive index layer having a physical thickness equal to the sum of the thicknesses of individual layers of the two or more adjacent low refractive index layers.

2. The optical article of claim 1, wherein the optical article has a Bayer value determined in accordance with the ASTM F735-81 standard greater than or equal to 5.5.

3. The optical article of claim 1, wherein the reflective coating has a number of layers greater than or equal to four, and the outermost low refractive index layer has a thickness of at least 70 nm.

4. The optical article of claim 1, wherein the reflective coating has a number of layers greater than or equal to four, and the outermost low refractive index layer has a thickness ranging from 130 nm to 300 nm.

5. The optical article of claim 1, wherein the reflective coating has a number of layers greater than or equal to four, and the penultimate low refractive index layer has a thickness ranging from 175 nm to 400 nm.

6. The optical article of claim 1, wherein the reflective coating has a number of layers greater than or equal to four, and the penultimate high refractive index layer has a thickness ranging from 10 nm to 40 nm.

7. The optical article of claim 1, wherein the reflective coating has a number of layers greater than or equal to four, and the penultimate low refractive index layer is thicker than the outermost low refractive index layer.

8. The optical article of claim 1, wherein the reflective coating has three layers, and the first layer has a thickness ranging from 200 nm to 400 nm.

9. The optical article of claim 1, wherein the reflective coating comprises the at least four layers, and
   the outermost low refractive index layer of the reflective coating has the physical thickness of at least 200 nm,
   the outermost high refractive index layer of the reflective coating has the physical thickness of 40 nm or less,
   the penultimate low refractive index layer of the reflective coating, in a direction moving away from the substrate, has the physical thickness of at least 220 nm, and
   the penultimate high refractive index layer of the reflective coating has the physical thickness ranging from 5 nm to 40 nm, or wherein the reflective coating has exactly three layers, and
the outermost layer of the reflective coating is a low refractive index layer having the physical thickness of 50 nm or less,
the penultimate layer of the reflective coating is a high refractive index layer having the physical thickness of 50 nm or less, and
the first layer of the reflective coating is a low refractive index layer having the physical thickness of at least 250 nm.

10. The optical article of claim 1, wherein the reflective coating comprises at least four layers, and
the outermost low refractive index layer of the reflective coating has the physical thickness of at least 230 nm,
the outermost high refractive index layer of the reflective coating has the physical thickness of 25 nm or less,
the penultimate low refractive index layer of the reflective coating has the physical thickness of at least 300 nm, and
the penultimate high refractive index layer of the reflective coating has the physical thickness ranging from 5 nm to 20 nm, or
wherein the reflective coating has three layers, and
the outermost layer of the reflective coating is a low refractive index layer having the physical thickness of 50 nm or less,
the penultimate layer of the reflective coating is a high refractive index layer having the physical thickness of 35 nm or less, and
the first layer of the reflective coating is a low refractive index layer having the physical thickness of at least 250 nm.

11. The optical article of claim 1, wherein the mean light reflection factor on said at least one main face in the visible region Rv, defined in the ISO 13666:1998 standard, is greater than or equal to 8%.

12. The optical article of claim 1, wherein the reflective coating has a number of layers lower than or equal to 10.

13. The optical article of claim 1, wherein the reflective coating has a thickness ranging from 300 nm to 1 µm.

14. The optical article of claim 1, wherein the high refractive index layers having the refractive index greater than 1.55 represent less than 20% of the thickness of the reflective coating.

15. The optical article of claim 1, wherein the high refractive index layers having the refractive index greater than 1.55 represent less than 15% of the thickness of the reflective coating.

16. The optical article of claim 1, wherein the reflective coating does not comprise any high refractive index layer having a physical thickness greater than or equal to 105 nm.

17. The optical article of claim 1, wherein the optical article is an ophthalmic lens.

18. The optical article of claim 1, wherein the reflective coating has at least one layer comprising $Ti_3O_5$.

* * * * *